United States Patent
Tsujimoto

(10) Patent No.: US 7,296,933 B2
(45) Date of Patent: Nov. 20, 2007

(54) TAPERED ROLLER BEARING

(75) Inventor: Takashi Tsujimoto, Shizuoka-ken (JP)

(73) Assignee: NTN Corporation, Osaka (JP)

( * ) Notice: Subject to any disclaimer, the term of this patent is extended or adjusted under 35 U.S.C. 154(b) by 241 days.

(21) Appl. No.: 11/139,978

(22) Filed: May 31, 2005

(65) Prior Publication Data
US 2006/0002646 A1  Jan. 5, 2006

(30) Foreign Application Priority Data
Jul. 5, 2004  (JP) ............................. 2004-227329

(51) Int. Cl.
*F16C 33/58* (2006.01)
(52) U.S. Cl. ..................... 384/571; 384/625
(58) Field of Classification Search ................. 384/571, 384/572, 576, 580, 625
See application file for complete search history.

(56) References Cited

U.S. PATENT DOCUMENTS

| | | | |
|---|---|---|---|
| 5,039,231 A * | 8/1991 | Kispert et al. ............... | 384/572 |
| 5,848,846 A * | 12/1998 | Sugiyama et al. ........... | 384/625 |
| 6,086,261 A * | 7/2000 | Nakagawa et al. .......... | 384/571 |
| 7,147,382 B2 * | 12/2006 | Suzuki et al. ................ | 384/569 |
| 2003/0123769 A1* | 7/2003 | Ohki ........................... | 384/492 |
| 2004/0047528 A1* | 3/2004 | Tsujimoto et al. .......... | 384/571 |

FOREIGN PATENT DOCUMENTS

JP  2003-028165  1/2003

* cited by examiner

*Primary Examiner*—Thomas R. Hannon
(74) *Attorney, Agent, or Firm*—Arent Fox LLP

(57) ABSTRACT

A tapered roller bearing 1 comprises an inner ring 2, an outer ring 3, a plurality of tapered rollers 4 rollably disposed between the inner and outer rings, and a cage 5 for holding the tapered rollers at predetermined circumferential intervals. In this tapered roller bearing, the roller coefficient $\{y=(\text{the number of rollers} \times \text{mean roller diameter})/(\pi \times \text{PCD})\}$ is greater than 0.94. At least one of the members, i.e., the outer ring, inner ring, and rolling elements, has a nitrogen rich layer. The grain size number of austenite crystal grains in the nitrogen rich layer exceeds number 10.

8 Claims, 10 Drawing Sheets

| Bearing | Roller coefficient | Life time | Remarks |
|---|---|---|---|
| Comparative example 1 (conventional article, cage of iron plate) | 0.86 | 16.4 hours | Inner ring abrasion |
| Example 1 (cage of iron plate) | 0.96 | 40.2 hours | Stopped by torque increase due to cage wear |
| Example 2 | 0.96 | Not less than 200 hours | Nothing abnormal, so test stopped |

0.05mm 0.05mm

TAPERED ROLLER BEARING

BACKGROUND OF THE INVENTION

1. Field of the Invention

This invention relates to a tapered roller bearing, particularly to a tapered roller bearing suitable for incorporation into the gear device of the transmission of an automobile.

2. Brief Description of the Prior Art

Transmissions for automobiles are classified broadly into the manual type and the automatic type. Further, they can also be classified according to the driving system of the vehicle: a trans-axle for front wheel drive (FWD), a transmission for rearwheel drive (RWD), and a transfer for four-wheel drive (4WD). They are used to speed-change the drive power from the engine and to transmit it to the drive shaft or the like.

FIG. 7 shows an example of the arrangement of the transmission of an automobile. This transmission is of the synchronous type, in which the left side is the engine side and the right side is the drive wheel side in the same figure. A tapered roller bearing 43 is interposed between a main shaft 41 and a main drive gear 42. In this example, the inner periphery of the main drive gear 42 is directly formed with an outer ring raceway surface for the tapered roller bearing 43. The main drive gear 42 is supported by a tapered roller bearing 44 for rotation relative to a casing 45. A clutch gear 46 is connected by engagement to the main drive gear 42, and a synchro-mechanism 47 is disposed adjacent the clutch gear 46.

The synchro-mechanism 47 comprises a sleeve 48 adapted to be moved axially (in a left-right direction in the same figure) by the action of a selector (not shown), a synchronizer key 49 axially slidably installed in the inner periphery of the sleeve 48, a hub 50 connected by engagement to the outer periphery of the main shaft 41, a synchronizer ring 51 slidably mounted on the outer periphery (the cone section) of the clutch gear 46, and a hold-down pin 52 and a spring 53 which elastically press the synchronizer key 49 against the inner periphery of the sleeve 48.

In the state shown in the same figure, the sleeve 48 and synchronizer key 49 are held in the neutral position by the hold-down pin 52. At this time, the main drive gear 42 runs idle relative to the main shaft 41. On the other hand, when the selector is actuated to cause the sleeve to move axially, for example, to the left, from the state shown in the same figure, the synchronizer key 49 moves axially to the left following the sleeve 48, so as to press the synchronizer ring 51 against the inclined surface of the cone section of the clutch gear 46. This decreases the rotative speed of the clutch gear 46 and reversely, increases the rotative speed of the synchro-mechanism 47. And, at about the time when the rotative speeds of the two have synchronized, the sleeve 48 further moves axially to the left, meshing with the clutch gear 46, and the main shaft 41 and the main drive gear 42 are connected to each other through the synchro-mechanism 47. This allows the main shaft 41 and the main drive gear 42 to synchronously rotate.

In this connection, automobile transmissions have recently tended to use low-viscosity oil so as to attain AT, CVT, low fuel consumption, etc., for the mission. In an environment where low viscosity oil is used, surface-start flaking, which results in a very short life, sometimes occurs in the inner ring raceway surface due to poor lubrication when such adverse conditions as (1) high oil temperature, (2) little oil quantity, and (3) loss of pre-load, simultaneously happen.

As for measures against this short life due to surface-start flaking, a direct and effective solution is to reduce the maximum surface pressure. To reduce the maximum surface pressure, it is necessary to change the bearing size or to increase the number of rollers of the bearing if the bearing size is not to be changed. To increase the number of rollers without decreasing the roller diameter, it is necessary to narrow the distance between pockets in the cage. To this end, however, the pitch circle of the cage has to be increased to draw the cage as close as possible to the outer ring.

As an example in which the cage is drawn to the side until it touches the inner diameter surface of the outer ring, there is a tapered roller bearing shown in FIG. 8 (refer to Patent Document 1: Japanese Patent Laid-Open No. 2003-28165). In this tapered roller bearing 61, the outer peripheral surfaces of the small diameter and large diameter annular sections 62a and 62b, respectively, of the cage 62 are placed in slide contact with the inner diameter surface of the outer ring 63 so as to guide the cage 62, and the outer diameter surface of the pole section 62c of the cage 62 is formed with a recess 64 for suppressing drag torque, thereby maintaining the non-contact state between the outer diameter surface of the pole section 62c and the raceway surface 63a of the outer ring 63. The cage 62 has the small diameter annular section 62a, the large diameter annular section 62b, and a plurality of pole sections 62c which axially connect the small diameter annular section 62a and the large diameter annular section 62b and which is formed with a recess 64 in the outer peripheral surface thereof. And disposed between pole sections 62c are a plurality of pockets for rollably receiving tapered rollers 65. The small diameter annular section 62a is provided with a flange section 62d integrally extending to the inner diameter side. The tapered roller bearing of FIG. 8 is an example intended to improve the strength of the cage 62, wherein the cage 62 is drawn to the side until it touches the inner diameter surface of the outer ring 63 in order to increase the peripheral width of the pole section 62c.

SUMMARY OF THE INVENTION

In the tapered roller bearing 61 described in Patent Document 1, the cage 62 is drawn to the outer diameter until it touches the inner diameter surface of the outer ring 63 to thereby increase the peripheral width of the POLE section 62c of the cage 62. Further, because of the presence of the recess 64 in the POLE section 62c of the cage 62, the plate thickness becomes inevitably thin, leading to a decrease in the rigidity of the cage 62, involving the possibility of the cage 62 being deformed depending on the stresses during assembly of the bearing 61 or the cage 62 being deformed during rotation of the bearing 61.

On the other hand, a conventional typical tapered roller bearing with a cage, excluding the tapered roller bearing described in Patent Document 1, is designed so that the roller coefficient γ (roller packaging percentage) defined by the following formula is normally not more than 0.94 in order to obtain appropriate POLE strength and smooth rotation of the cage 72 by securing the POLE width of the cage 72 after avoidance, as shown in FIG. 9, of contact between the outer ring 71 and the cage 72.

Roller coefficient $\gamma=(Z \cdot DA)/(\pi \cdot PCD)$, where Z is the number of rollers, DA is the mean diameter of the rollers, and PCD is the pitch circle diameter.

In addition, in FIG. 9, the numeral 73 denotes the tapered roller; 74 denotes a pole surface; and θ denotes a window angle.

An object of the invention is to prevent premature breakage due to an increase in loading capacity and excessive surface pressure.

The tapered roller bearing of the invention comprises an inner ring, an outer ring, a plurality of tapered rollers rollably disposed between the inner and outer rings, and a cage for holding the tapered rollers at predetermined circumferential intervals, the tapered roller bearing being characterized in that the roller coefficient γ exceeds 0.94, in that at least one of the members, i.e., the outer ring, inner ring and rolling bodies, has a nitrogen rich layer, and in that the grain size number of the austenitic crystal grains in the nitrogen rich layer is in the range which exceeds number 10.

The nitrogen rich layer, which is a surface layer formed on the raceway ring (outer ring or inner ring) or rolling body, having increased nitrogen content, can be formed as by carbonitriding or nitriding. The nitrogen content in the nitrogen rich layer is preferably in the range of 0.1%-0.7%. If the nitrogen content is less than 0.1%, no effect will be produced and the rolling life will decrease particularly under conditions of foreign matter inclusion. If the nitrogen content exceeds 0.7%, holes called voids will form or the amount of retained austenite will be too much to provide hardness, leading to short life. The nitrogen content of the nitrogen rich layer formed in the raceway ring is a value measured at the 50 μm-thick surface layer of the raceway surface after grinding; it can be measured as by EPMA (wavelength-diffusion type X-ray microanalyzer).

Further, the fact that the austenite grain diameter is so small that the grain size number of austenite crystal grains exceeds number 10 makes it possible to greatly improve rolling fatigue life. If the grain size number of austenite grain diameter is not more than number 10, the rolling fatigue life will not be improved so much; therefore, it is set in a range exceeding number 10. Normally, it is set to be not less than number 11. The smaller the austenite grain diameter, the more desirable. Generally, however, it is difficult to obtain a grain size number which exceeds number 13. In addition, the austenite grains in the bearing part do not change in the surface layer having the nitrogen rich layer or in the interior inside the same. Therefore, the positions in which to define the range of crystal grain size number should be the surface layer and the interior. The austenite crystal grains are such that for example, even after a hardening treatment has been performed, traces of austenite crystal grain boundary, which is present immediately before the hardening, remain, and it is on the basis of such traces that crystal grains are referred to.

The window-angle of a pocket may range from 55° to 80°. The term "window angle" refers to the angle formed by the guide surfaces of pole sections abutting against the peripheral surface of a single roller. The reason for setting the lower limit of window angle at 55° is for the purpose of securing good state of contact with the roller, and the reason for setting the upper limit thereof at 80° is that if this value is exceeded, the radial pressing force increases, involving the danger that smooth rotation cannot be obtained even if self-lubricating resin material is used. In addition, usual cages have a window-angle of 25°-50°.

The cage may be constituted by engineering plastic superior in mechanical strength, oil resistance, and heat resistance. The use of resin material for the cage has a feature that, as compared with a cage made of iron plate, the cage is light-weight, is self-lubricating, and has a low friction coefficient, which feature, coupled with the effect of the lubricating oil present in the bearing, makes it possible to suppress occurrence of wear due to contact with the outer ring. As compared with steel plate, such resin is light-weight and has so low a friction coefficient that it is suitable for reducing torque loss and cage wear at the time of starting of the bearing.

Engineering plastics include general purpose engineering plastics and super engineering plastics. Typical ones are shown below but these are by way of example, and the invention is not limited thereto.

General purpose engineering plastics: polycarbonate (PC), polyamide 6 (PA6), polyamide 66 (PA66), polyacetal (POM), modified polyphenylene ether (m-PPE), polybutylene terephthalate (PBT), GF-reinforced polyethylene terephthalate (GF-PET), ultra high molecular weight polyethylene (UHMW-PE).

Super engineering plastics: polysulfone (PSF), polyether sulfone (PES), polyphenylene sulfide (PPS), polyarylate (PAR), polyamideimide (PAI), polyetherimide (PEI), Poly-ether-Etherketone (PEEK), liquid crystal polymer (LCP), thermoplastic polyimide (TPI), polybenz-imidazole (PBI), polymethyl pentene (TPX), poly 1, 4-cyclohexane dimethylene terephthalate (PCT), polyamide 46 (PA46), polyamide 6T (PS6T), polyamide 9T (PA9T), polyamide 11, 12) (PA11, 12), fluororesin, polyphthalamide (PPA).

By setting the roller coefficient γ of the tapered roller bearing, not only the loading capacity increases but also the maximum surface pressure on the raceway surface can be reduced, so that the surface-start abrasion, which results in a very short life, under conditions of harsh lubrication can be prevented.

Further, in the tapered roller bearing of the invention, after a nitrogen rich layer has been formed, the austenite grain diameter is reduced to the extent of not less than number 11 in terms of grain size number, so that rolling fatigue life is greatly improved, making it possible to obtain superior anti-crack strength and resistance to time-dependent dimensional change.

DESCRIPTION OF THE PREFERRED EMBODIMENTS

Figure 1:
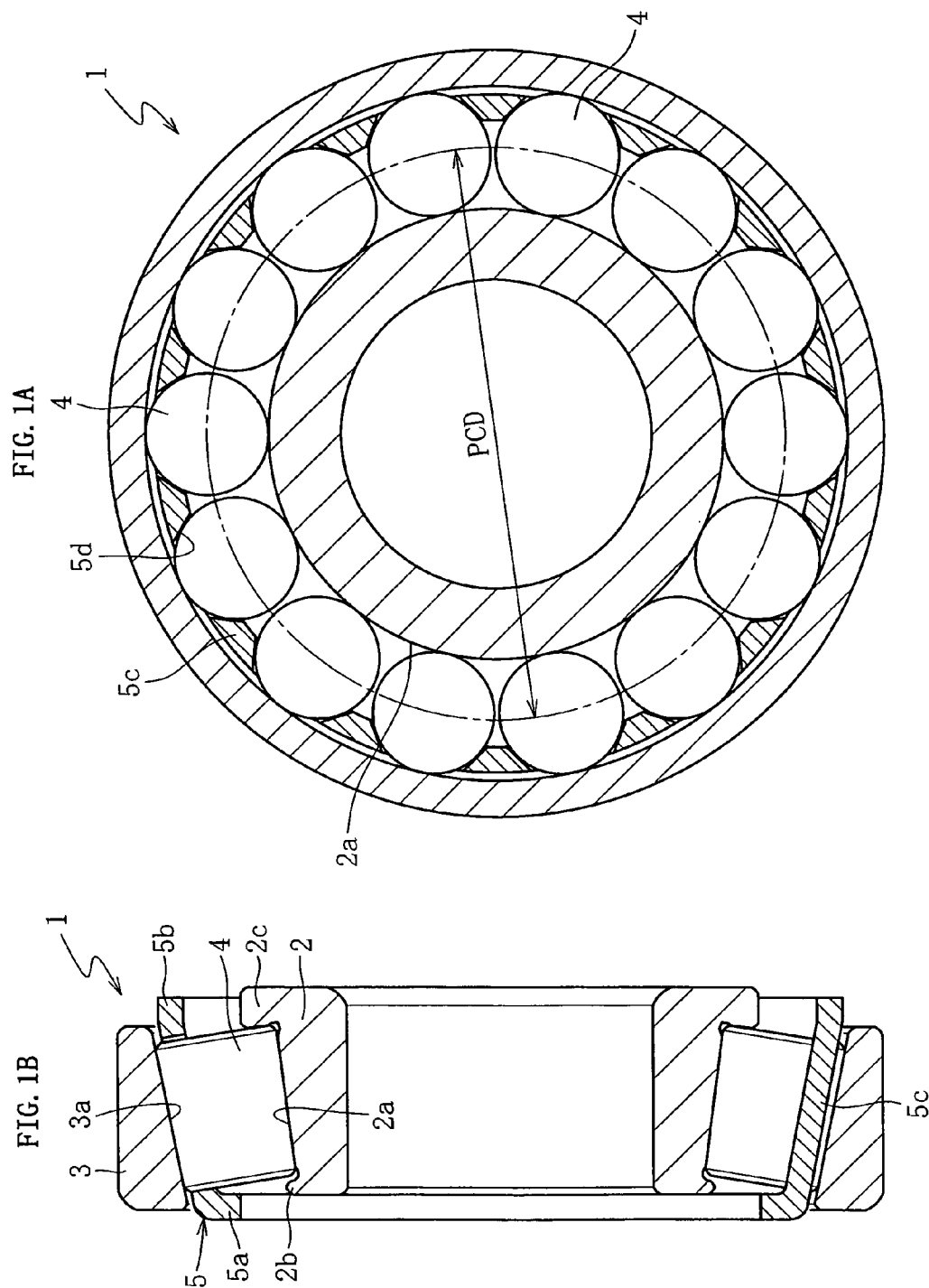
FIG. 1A is a cross sectional view of a tapered roller bearing of the invention.
FIG. 1B is a longitudinal sectional view of the bearing.

An embodiment of the invention will now be described with reference to FIGS. 1A-4. A tapered roller bearing 1 in an embodiment shown in FIGS. 1A and 1B has a tapered raceway surface 2a and comprises an inner ring 2 having a small flange section 2b on the small diameter side of the raceway surface 2a and a large flange section 2c on the large diameter side, an outer ring 3 having a tapered raceway surface 3a, a plurality of tapered rollers 4 rollably disposed between the raceway surface 2a of the inner ring 2 and the raceway surface 3a of the outer ring 3, and a cage 5 for holding the tapered rollers at circumferentially equispaced intervals. Here, the tapered roller bearing 1 has a roller coefficient γ>0.94.

The cage 5, which is integrally molded of a super engineering plastic, such as, for example, PPS, PEEK, PA, PPA, or PAI, comprises an annular section 5a on the small diameter side, an annular section 5b on the large diameter side, and a plurality of pole sections 5c axially connecting the annular sections 5a and 5b on the small and large diameter sides. In addition, besides the use of such engineering plastic as PPS, PEEK, PA, PPA, or PAI, use may be made of a material prepared by blending glass fiber or carbon fiber with such resin material or with other engineering plastic so as to increase strength as the need arises.

Figure 2:
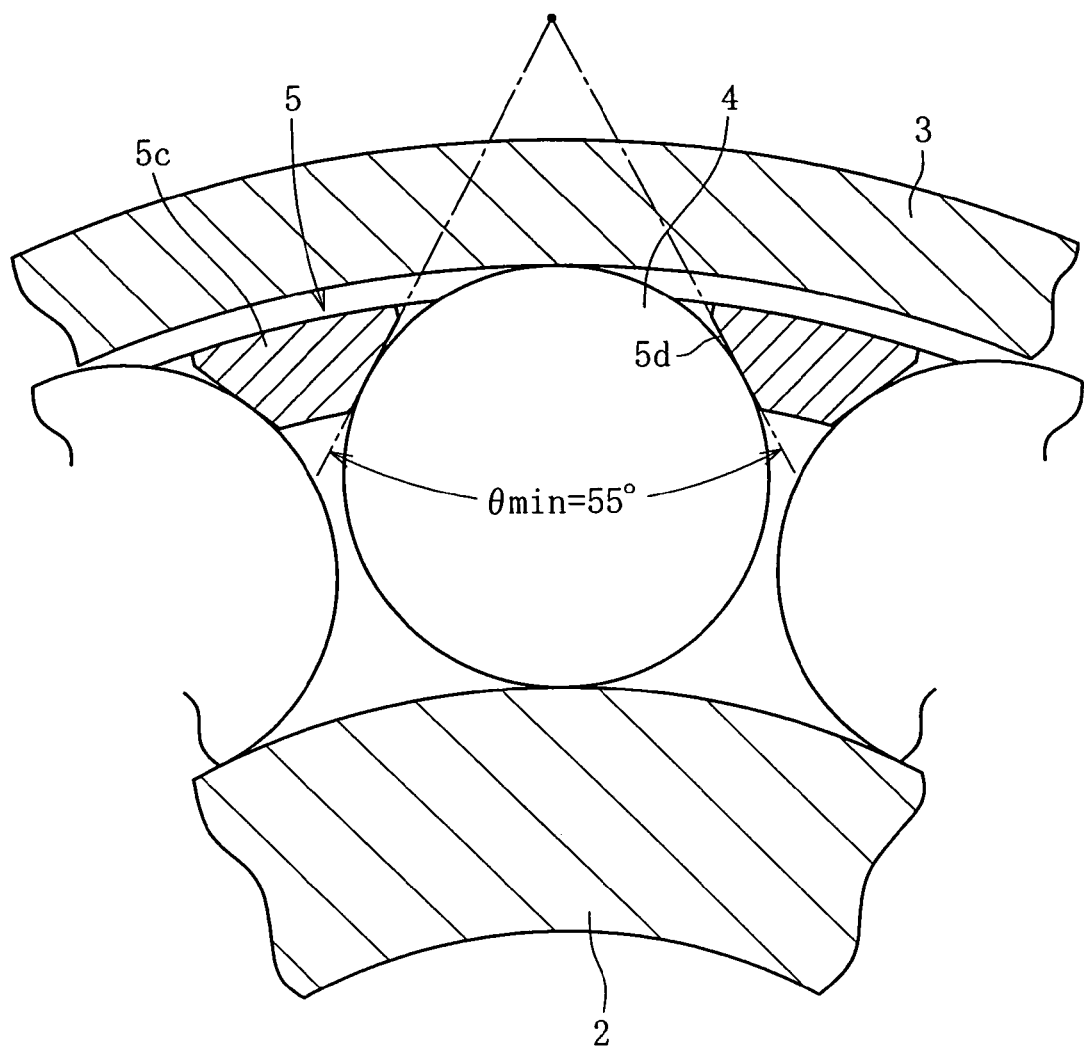
FIG. 2 is a partial enlarged sectional view of a tapered roller bearing with a window angle at its lower limit.
Figures 3, 4:
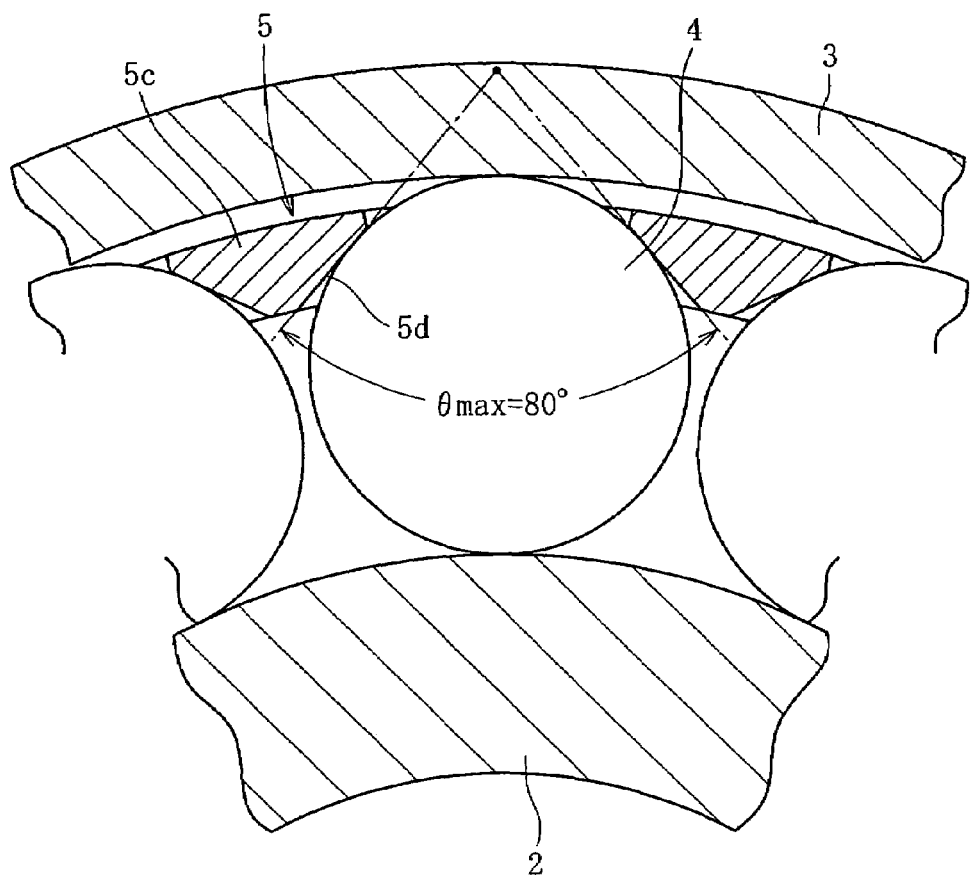
FIG. 3 is a partial enlarged sectional view of a tapered roller bearing with a window angle at its upper limit.
FIG. 4 is a table showing the results of life tests on bearings.
Figure 9:
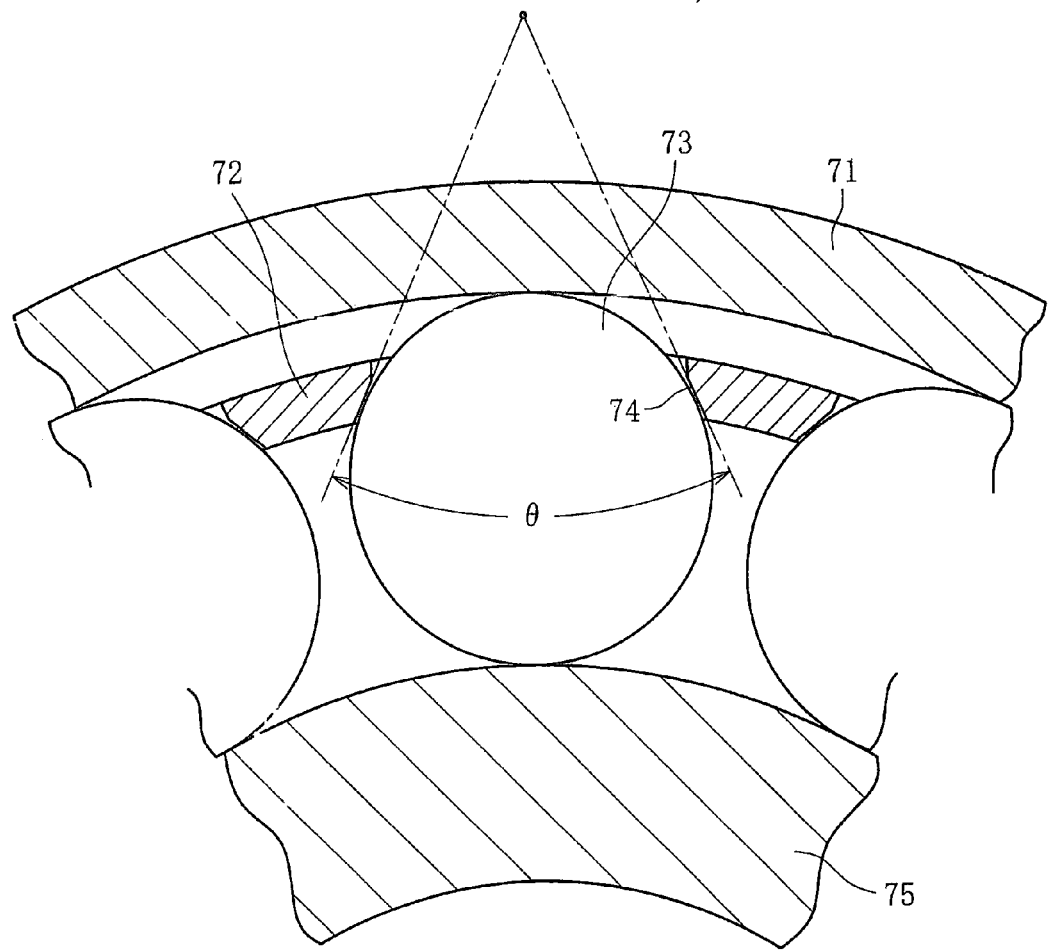
FIG. 9 is a partial enlarged sectional view of another conventional tapered roller bearing.

The window angle θ of pole surfaces 5d is such that the lower limit window angle θ min is 55°, as shown in FIG. 2, and the upper limit window angle θ max is 80°, as shown in FIG. 3. The window angle, as shown in FIG. 9, for a typical tapered roller bearing with a cage which is spaced from the outer ring is about 50° at most. The reason for setting the lower limit window angle θ min at 55° is for the purpose of securing good state of contact with the roller; if the window angle is less than 55°, the state of contact with the roller becomes poor. That is, if the window angle is 55° or above, it is possible to have γ>0.94 after securing the cage strength and to secure a good state of contact. Further, the reason for setting the upper limit window angle θ max at 80° is that if it exceeds this value, the radial pressing force increases, involving the danger that smooth rotation cannot be obtained even if self-lubricating resin material is used.

FIG. 4 shows the results of bearing life tests. In FIG. 4, "Comparative example" in "Bearing" column is a typical conventional tapered roller bearing with a cage which is spaced from the outer ring. "Example 1 refers to those of the tapered roller bearings of the invention in which the roller coefficient γ alone is set at γ>0.94 in contrast to the conventional one. "Example 2" refers to those tapered roller bearings of the invention in which the roller coefficient γ is set at γ>0.94 and the window angle is set in the range of 55°-80°. The tests were conducted under conditions of harsh lubrication and excessive load. As is clear from the same figure, "Example 1" has a long life which is not less than twice the life of "Comparative example." Further, the bearing of "Example 2" has a roller coefficient of 0.96, which is the same as in "Example 1," but its life time is not less than about five times that of "Example 1." In addition, the size of "Comparative example," "Example 1, and "Example 2" is φ45×φ81×16 (in mm). The number of rollers is 24 for "Comparative example," and 27 for "Example 1" and "Example 2." Oil film parameter Λ=0.2.

Next, a modified embodiment of the invention will be described with reference to FIGS. 5 and 6. The tapered roller bearing 1 shown in the same figures is in the form in which the outer diameter surface of each of the pole sections 5c of a cage 5 integrally molded of engineering plastic is formed with a projecting section 5f convexed toward the outer ring raceway surface. The rest of the arrangement is the same as in the cage 5 described above. This projecting section 5f, as shown in FIG. 6, is such that the cross sectional contour of the pole section 5c is arcuate. The radius of curvature $R_2$ of this arc is smaller than the outer ring raceway surface radius $R_1$. The intension is to ensure that a good wedge-like oil film is formed between the projecting section 5f and the outer ring raceway surface. It is desirable that the radius of curvature $R_2$ be about 70-90% of the outer ring raceway surface radius $R_1$. If it is less than 70%, the inlet opening angle of the wedge-like oil film becomes so large that the dynamic pressure decreases. Further, if it exceeds 90%, the inlet angle of the wedge-like oil film becomes so small that the dynamic pressure likewise decreases. Further, the width $W_2$ of the projecting section 5f is desirably more than 50% of the width $W_1$ of the pole section 5c ($W_2 \geq 0.5 \times W$). The reason is that if it is less than 50%, the height of the projecting section 5f cannot be secured sufficiently to form a good wedge-like oil film. In addition, the outer ring raceway surface radius $R_1$ continuously changes from large diameter side to small diameter side, so that similarly the radius of curvature $R_2$ of the projecting section 5f continuously changes from the large radius of curvature $R_2$ of the large diameter-side annular section 5b to the small radius of curvature $R_2$ of the small diameter-side annular section 5a.

Figure 5:
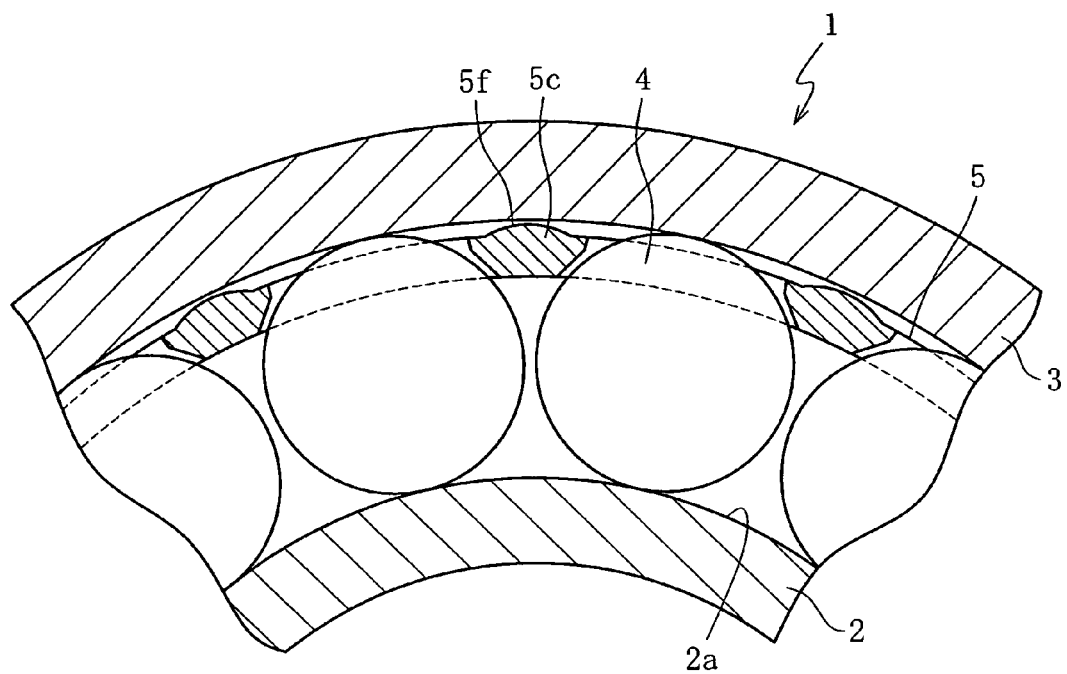
FIG. 5 is a partial sectional view of a tapered roller bearing according to a modification of the invention.
Figure 6:
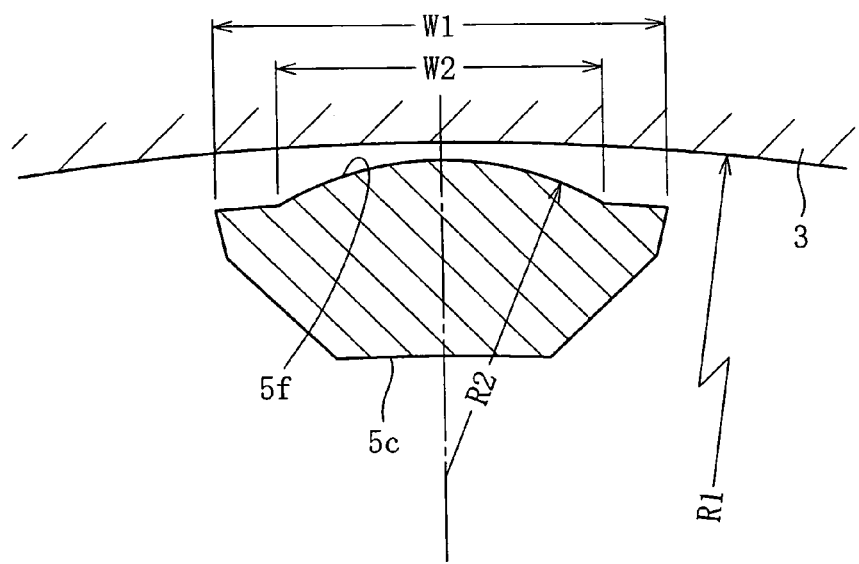
FIG. 6 is a sectional view of a pole section of the cage shown in FIG. 5.

The tapered roller bearing 1 shown in FIGS. 5 and 6 is arranged in the manner described above, so that when the bearing 1 starts to rotate and so does the cage 5, a wedge-like oil film is formed between the outer ring raceway surface and the projecting section 5f of the cage 5. This wedge-like oil film produces a dynamic pressure substantially proportional to the rotative speed of the bearing 1. Therefore, even if the pitch circle diameter (PCD) of the cage 5 is increased beyond the conventional value so as to place the cage close to the outer ring raceway surface, the bearing 1 can be rotated without producing much wear or torque loss, so that the number of rollers can be reasonably increased.

Figure 10:
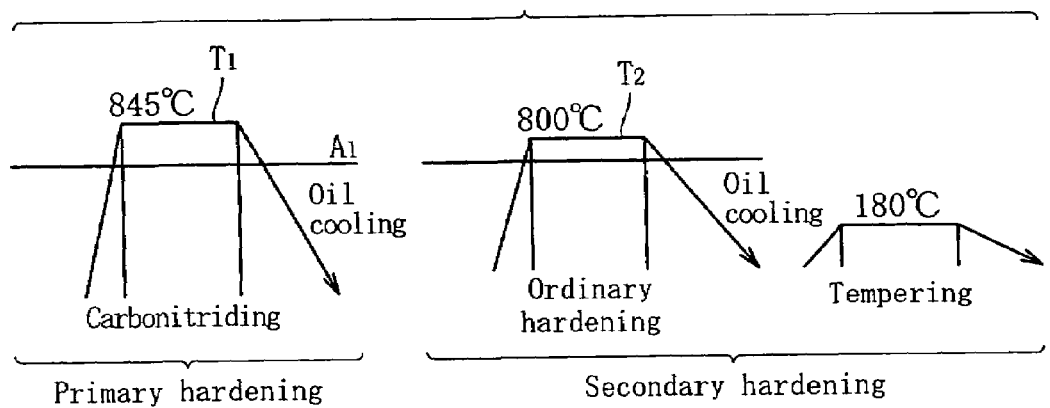
FIG. 10 is a view for explaining a method of heat-treating tapered roller bearings.
Figure 11:
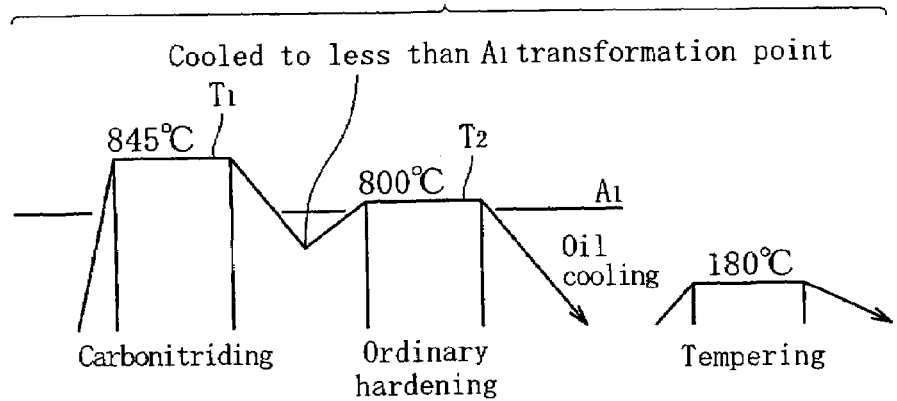
FIG. 11 is a view for explaining a modification of the method of heat-treating tapered roller bearings.

At least one of the parts, the inner ring 2, outer ring 3, and cage 4, of the tapered roller bearing 1 has a nitrogen rich layer. As a concrete example for forming the nitrogen rich layer, a heat treatment including carbonitriding will be described. FIG. 10 is a view for explaining the heat treating method for rolling bearings in the embodiment of the invention, and FIG. 11 is a view for explaining a modification thereof. FIG. 10 is a heat treatment pattern showing a method in which primary and secondary hardenings are performed, and FIG. 11 is a heat treatment pattern showing a method in which a material is cooled to a temperature less than A1 transformation temperature in the course of hardening, and then it is reheated for final hardening. In these figures, at a treatment T1, penetration of carbon is fully effected with carbon and nitrogen diffused in the substrate of steel, and then it is cooled to a temperature less than A1 transformation temperature. Next, at a treatment T2 in the figures, it is reheated to a temperature above A1 transformation temperature and lower than the treatment T1, from which temperature it is subjected to oil-hardening.

The above heat treatment, while carbonitriding a surface layer portion, improves crack strength more than a conventional carbonitriding hardening, that is, carbonitriding followed by a single hardening; thus, time-dependent dimensional change can be reduced. The rolling bearing of the invention produced by the heat treatment pattern of FIG. 10 or FIG. 11 has a microstructure in which the grain diameter of austenite crystal grains is not more than half of the conventional value. The bearing part subjected to the heat treatment has a long life in relation to rolling fatigue, having improved crack strength and reduced time-dependent dimensional change. The heat treatment in which the secondary hardening temperature is lowered to make the crystal grains finer reduces the amount of retained austenite in the surface layer and in the interior, resulting in superior anti-crack strength and resistance to time-dependent dimensional change.

Figure 12A:
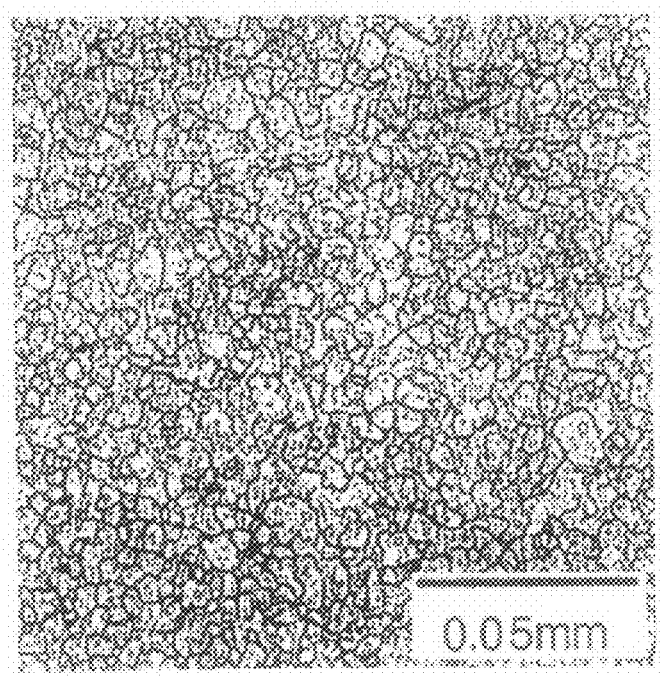
FIG. 12A is a view showing the microstructure, particularly austenite grains of an inventive bearing part.
Figure 12B:
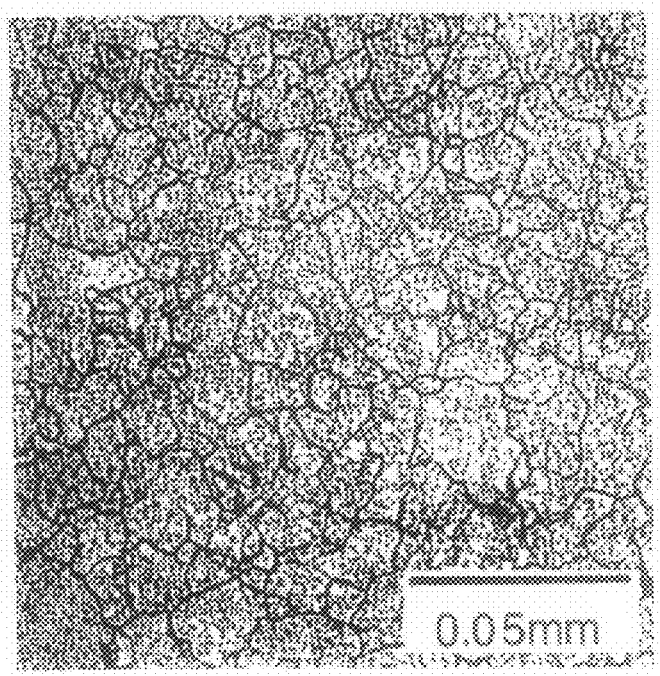
FIG. 12B is a view showing the microstructure, particularly austenite grains of a conventional bearing part.
Figure 13A:
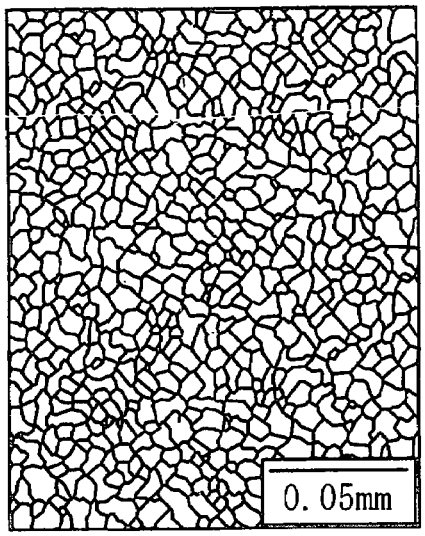
FIG. 13A shows austenite grain boundaries which graphically show FIG. 12A.
Figure 13B:
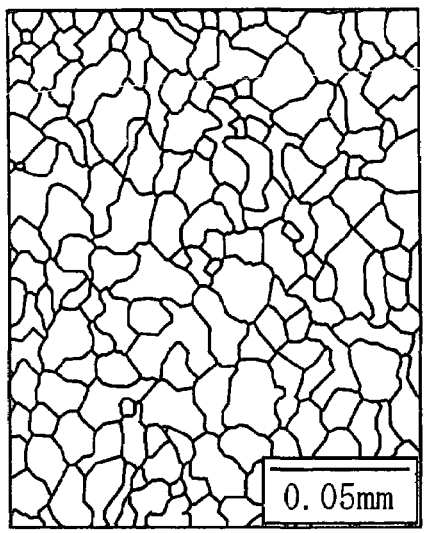
FIG. 13B shows austenite grain boundaries which graphically show FIG. 12B.

FIGS. 12A and 12B are views showing the microstructure, particularly austenite grains of the bearing part. FIG. 12A shows the bearing part in an inventive example, and FIG. 12B shows the conventional bearing part. That is, the austenite crystal grain size of the raceway ring of a rolling bearing which is an embodiment of the invention subjected to the heat treatment pattern shown in FIG. 10 is shown in FIG. 12A. Further, the austenite crystal grain size of bearing steel subjected to the conventional heat treating method is shown in FIG. 12B for comparison purposes. Further, FIGS. 13A and 13B show the austenite crystal grain sizes which graphically show FIGS. 12 A and 12B. Because of the structure showing such austenite crystal grain size, the conventional austenite grain size is number 10 in terms of JIS (Japanese Industrial Standards), and according to the heat treating method shown in FIG. 10 or 11, fine grains having number 12 can be obtained. Further, the mean grain size of FIG. 12A was microtomically examined and found to be 5.6 μm.

Embodiments

Embodiments of the invention will now be described.

Embodiment I

JIS SUSJ2 Material (1.0 wt % C-0.25 wt % S1-0.4 wt % Mn-1.5 wt % Cr) was used and (1) hydrogen quantity measurement, (2) crystal grain size measurement, (3) Charpy impact test, (4) breaking stress value measurement, and (5) rolling fatigue test were conducted. Table 1 shows the results thereof.

TABLE 1

|  | Sample | | | | | | Conventional carbonitriding | Ordinary hardening |
| --- | --- | --- | --- | --- | --- | --- | --- | --- |
|  | A | B | C | D | E | F | | |
| Secondary hardening Temperature (° C.) | 780 | 800 | 815 | 830 | 850 | 870 | — | — |
| Hydrogen quantity (ppm) | — | 0.37 | 0.40 | 0.38 | 0.42 | 0.40 | 0.72 | 0.38 |
| Crystal grain size (JIS) | — | 12 | 11.5 | 11 | 10 | 10 | 10 | 10 |
| Charpy impact value (J/cm$^2$) | — | 6.65 | 6.40 | 6.30 | 6.20 | 6.30 | 5.33 | 6.70 |
| Breaking stress value (MPa) | — | 2840 | 2780 | 2650 | 2650 | 2700 | 2330 | 2770 |
| Rolling fatigue life Ratio (L$_{10}$) | — | 5.4 | 4.2 | 3.5 | 2.9 | 2.8 | 3.1 | 1 |

The production history of each sample is as follows:

Samples A-D (inventive examples): carbonitriding temperature, 850° C., holding time, 150 minutes. The atmosphere was a gas mixture of RX gas and ammonia gas. In the heat treatment pattern shown in FIG. 10, primary hardening is performed at a carbonitriding temperature of 850° C. and the samples were heated to a temperature range of 780° C.-870° C. which is lower than the carbonitriding temperature, so as to perform secondary hardening. However, the sample A heated to a secondary hardening temperature of 780° C. was excluded from the test because of its insufficient hardening.

Samples E and F (comparative examples): carbonitriding was performed with the same history as in the inventive examples A-D, and secondary hardening was performed at temperatures of 850° C.-870° C., which were above the carboniriding temperature of 850° C.

Conventional carbonitrided article (comparative example) carbonitriding temperature, 850° C., holding time, 150 minutes, the atmosphere was a gas mixture of RX gas and ammonia gas. Hardening was performed at the carbonitriding temperature, with no secondary hardening.

Ordinary hardening (comparative example): hardening was performed by heating to 850° C., without carbonitriding. Secondary hardening was not performed.

Next, testing methods will be described.

(1) Measurement of Hydrogen Quantity

Hydrogen quantity was measured by DH-103 Model hydrogen analyzer made by LECO company; the non-diffusive hydrogen quantity in steel was measured. The diffusive hydrogen quantity was not measured. The specifications of this DH-103 Model hydrogen analyzer made by LECO company are shown below.

Analysis range: 0.01-50.00 ppm

Analysis accuracy: ±0.1 ppm or ±3% H (the larger of the two)

Analysis sensitivity: 0.01 ppm

Detection system: heat conductivity method

Sample weight size: 10 mg-35 mg (maximum: 12 mm in diameter×100 mm in length)

Heating furnace temperature range: 50° C.-1100° C.

Reagent: Anhydron Mg $(ClO_4)_2$, ascarite NaOH

Carrier gas: nitrogen gas, gas dosing gas: hydrogen gas, each gas having a purity of not less than 99.99 and a pressure of 40 psi (2.8 kgf/cm$^2$).

An outline of the measuring procedures is as follows:

A sample taken by an exclusive sampler is put in the hydrogen analyzer, together with the sampler. The diffusive hydrogen in the interior is led into a heat conductivity detector by the nitrogen carrier gas. This diffusive hydrogen is not measured in this example. Next, the sample is taken out of the sampler and heated in a resistance heating furnace, and the non-diffusive hydrogen is led into the heat conductivity detector by the nitrogen carrier gas. In the heat conductivity detector, the heat conductivity is measured, whereby the non-diffusive hydrogen quantity can be found.

(2) Measurement of Crystal Grain Size

Crystal grain size was measured on the basis of the austenite crystal grain size measuring method for steel in JIS G 0551.

(3) Charpy Impact Test

Charpy impact tests were conducted on the basis of the Charpy impact testing method for metal materials in JIS Z 2202. The test piece used was a U-notched test piece (JIS No. 3 test piece) shown in JIS Z 2202.

(4) Measurement of Breaking Stress Value

Figure 14:
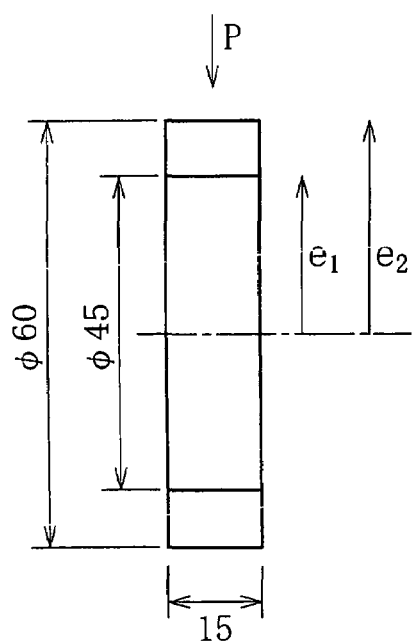
FIG. 14 is a view showing a test piece for static breaking strength test (measurement of breaking stress value)

FIG. 14 shows a test piece for static breaking test (breaking stress value measurement). A load is applied in the P-direction in the figure and the load is measured until break. Thereafter, the break load obtained is converted into a stress value by stress calculation formulas shown below for curved beams. In addition, the test piece is not limited to the one shown in FIG. 14, and test pieces of other shapes may be used.

Let $\sigma_1$ be the fiber stress in the convex surface of the test piece of FIG. 14, and $\sigma_2$ be the fiber stress in the concave surface thereof. Then, the $\sigma_1$ and $\sigma_2$ can be found by the following formulas (Mechanical Engineering Handbook A4 Part, Strength of Materials A 4-40). Here, N is the axial force in a section including the axis of an annular test piece, A is the cross sectional area, $e_1$ is the outer radius, and $e_2$ is the inner radius. Further, $\kappa$ is the section modulus for curved beams.

$$\sigma_1 = (N/A) + \{M/(A\rho_0)\}[1 + e_1/\{\kappa(\rho_0 + e_1)\}]$$

$$\sigma_2 = (N/A) + \{M/(A\rho_0)\}[1 - e_2/\{\kappa(\rho_0 - e_2)\}]$$

$$\kappa = -(1/A)\int_A \{\eta/(\rho_0 + \eta)\} dA$$

(5) Rolling Fatigue Life

Figure 15A:
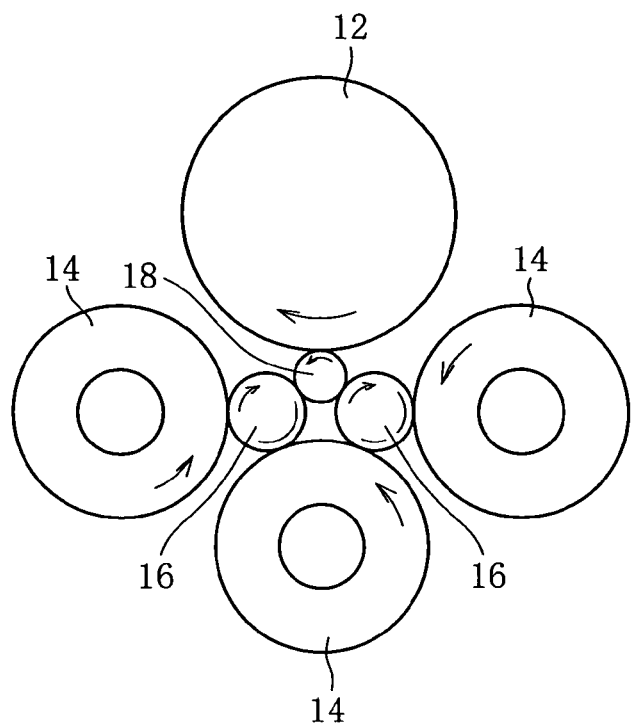
FIG. 15A is a schematic front view of a rolling fatigue life testing machine.
Figure 15B:
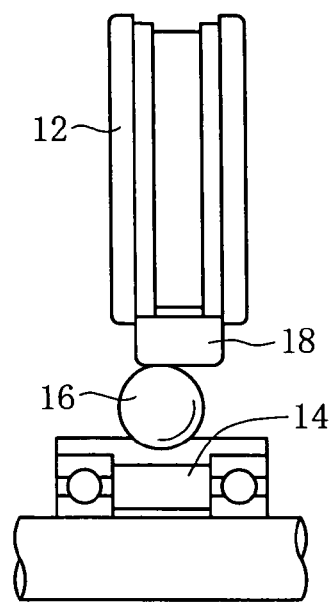
FIG. 15B is a schematic side view of the machine shown in FIG. 15A.

Test conditions for rolling fatigue life test are shown in Table 2. Further, FIGS. 15A and 15B are schematic views of a rolling fatigue testing machine. FIG. 15A is a front view, and FIG. 15B is a side view. In FIGS. 15A and 15B, a rolling fatigue life test piece 18 is driven by a drive roll 12 and is rotating in contact with a ball 16. The ball 16, which is a ¾ inch ball, is guided by a guide roll 14, and rolls with a high surface pressure exerted between the ball and the rolling fatigue life test piece 12.

The test results in the Embodiment I shown in Table 1 are as follows:

(1) Hydrogen Quantity

The conventional carbonitrided article just after being carbonitrided has as high a value as 0.72 ppm. This is believed to be due to decomposition of ammonia ($NH_3$) contained in the carbonitriding atmosphere to cause the hydrogen to enter the steel. In contrast, in the samples B-D, the hydrogen quantity has reduced to about half, being 0.37-0.40 ppm. This hydrogen quantity is on the same level as in the ordinarily hardened article.

The reduction of hydrogen quantity makes it possible to reduce brittleness of steel due to solid solution of hydrogen. That is, the reduction of hydrogen quantity have greatly improved the Charpy impact values of the inventive examples B-D.

(2) Crystal Grain Size

In the case where the secondary hardening temperature is lower than the hardening temperature during carbonitriding (primary hardening), that is, in the case of the samples B-D, crystal grain size has been remarkably made finer to the extent that the crystal grain size number is 11-12. The austenite grains of the samples E and F and of the conventional carbonitrided article and ordinarily hardened article have crystal grain size number 10, which shows that they are coarser than those of the samples B-D in the inventive examples.

(3) Charpy Impact Test

According to Table 1, whereas the Charpy impact value of the conventional carbonitrided article is 5.33 J/cm$^2$, the Charpy impact values of the samples B-D in the inventive examples are as high as 6.30-6.65 J/cm$^2$. Among these, those having lower secondary hardening temperatures tend to have higher Charpy impact values. The Charpy impact value of the ordinarily hardened article is as high as 6.70 J/cm$^2$.

(4) Measurement of Breaking Stress Value

The breaking stress value corresponds to anti-crack strength. According to Table 1, the conventional carbonitrided article has a breaking stress value of 2330 MPa. As compared with this, the breaking stress values of the samples B-D are improved, being 2650-2840 MPa. The breaking stress value of the ordinarily hardened article is 2770 MPa. The improved anti-crack strength of the samples B-D is believed to be largely due to not only the austenite crystal grains being made finer but also the reduction of hydrogen content.

(5) Rolling Fatigue Test

According to Table 1, reflecting the absence of a carbonitrided layer in the surface layer, the ordinarily hardened article is lowest in rolling fatigue life L10. As compared with this, the rolling fatigue life of the conventional carbonitrided article is 3.1 times. The rolling fatigue life of the samples B-D is remarkably improved over the conventional carbonitrided article. The samples E and F are substantially equal in this value to the conventional carbonitrided article.

To summarize, the samples B-D in the inventive examples are reduced in hydrogen content, made finer in austenite crystal grain size to the extent of not less than number 11, and improved in Charpy impact value, anti-crack strength, and rolling fatigue life.

Embodiment II

Embodiment II will be described. A series of tests were conducted on the following X-material, Y-material, and Z-material. The material to be heat-treated was JIS SUJ2 Material (1.0 wt % C-0.25 wt % S1-0.4 wt % Mn-1.5 wt % Cr), being common to the X-material-Z-material. The production history of each of the X-material-Z-material is as follows:

X-material (comparative example): ordinary hardening alone (no carbonitriding).

Y-material (comparative example): hardened just after carbonitriding (conventional carbonitriding). Carbonitriding temperature was 845° C., and holding time was 150 minutes. The atmosphere for carbonitriding was RX gas+ammonia gas.

Z-material (inventive example): a bearing steel having the heat treatment pattern of FIG. 10 applied thereto. Carbonitriding temperature was 845° C. and holding time was 150 minutes. The atmosphere for carbonitriding was RX gas+ammonia gas. The final hardening temperature was 800° C.

(1) Rolling Fatigue Life

Figure 7:
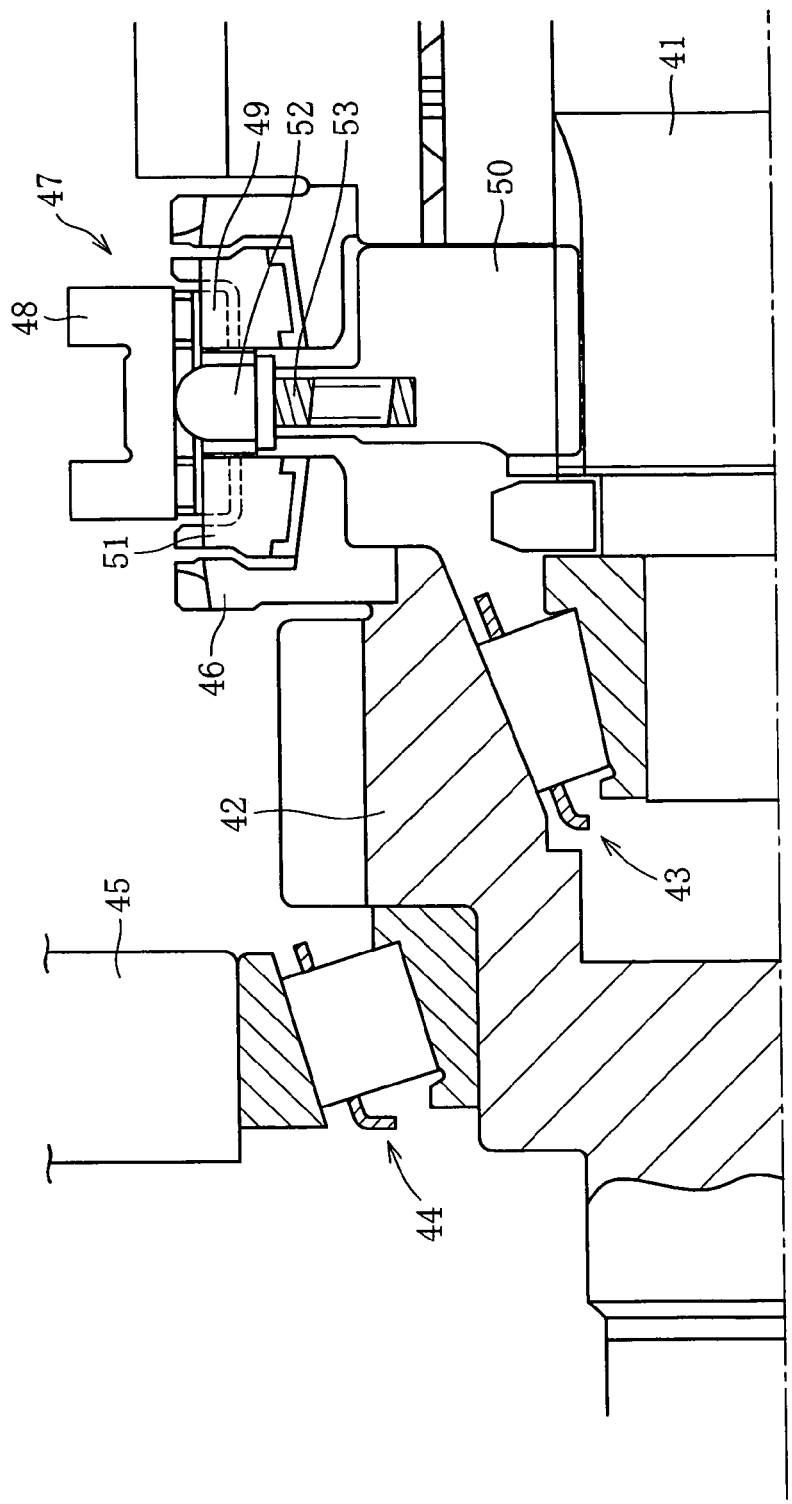
FIG. 7 is a sectional view of a general transmission for automobiles.
Figure 8:
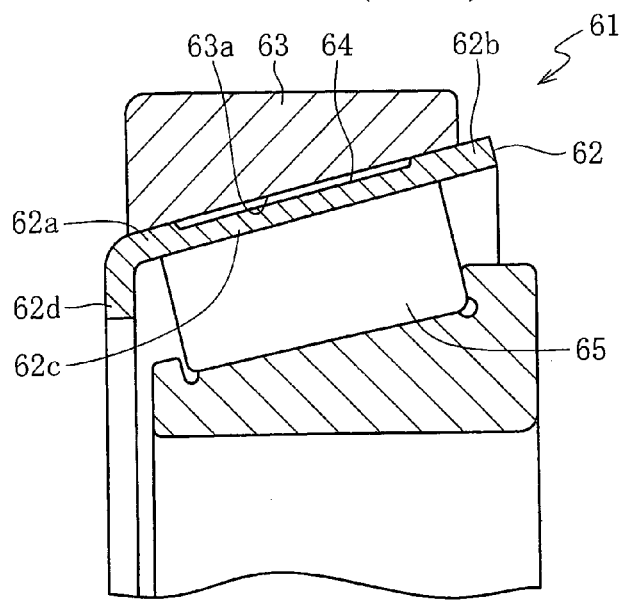
FIG. 8 is a sectional view of a conventional tapered roller bearing with the cage drawn to the outer ring.

The test conditions and testing device for rolling fatigue life are as shown in Table 2 and FIG. 7, as described above. The results of the rolling fatigue life tests are shown in Table 3.

TABLE 2

| Test piece | φ 12 × L22 cylindrical test piece |
|---|---|
| Number of tests | 10 |
| Mating steel ball | ¾ inch (19.05 mm) |
| Contact surface pressure | 5.88 GPa |
| Loading speed | 46240 cpm |
| Lubricating oil | Turbine VG68 forced circulation oiling |

TABLE 3

| | Life (number of times of loading) | | |
|---|---|---|---|
| Material | $L_{10}$ (×10$^4$) | $L_{60}$ (×10$^4$) | $L_{10}$ ratio |
| X-material | 8017 | 18648 | 1.0 |
| Y-material | 24656 | 33974 | 3.1 |
| Z-material | 43244 | 69031 | 5.4 |

According to Table 3, the Y-material of the comparative example shows 3.1 times the $L_{10}$ life (the life such that one out of every ten test pieces breaks) of the X-material also of the comparative example subjected to ordinary hardening alone, exhibiting the long life effect due to carbonitriding. In contrast, the Z-material of the inventive example shows as long a life as 1.74 times that of the B-material and 5.4 times that of the X-material. The main factor for this improvement is believed to be due to microstructure being made finer.

(2) Charpy Impact Test

Charpy impact tests were conducted using U-notched test pieces by a method similar to the JISZ2242. The test results are shown in Table 4.

TABLE 4

| Material | Charpy impact value (J/cm$^2$) | Impact value ratio |
|---|---|---|
| X-material | 6.7 | 1.0 |
| Y-material | 5.3 | 0.8 |
| Z-material | 6.7 | 1.0 |

The Charpy impact value of the Y-material (comparative example) subjected to carbonitriding is not higher than that of the X-material (comparative example) subjected to ordinary hardening, but the Z-material shows a value equal to that of the X-material.

(3) Test for Static Breaking Toughness Value

Figure 16:
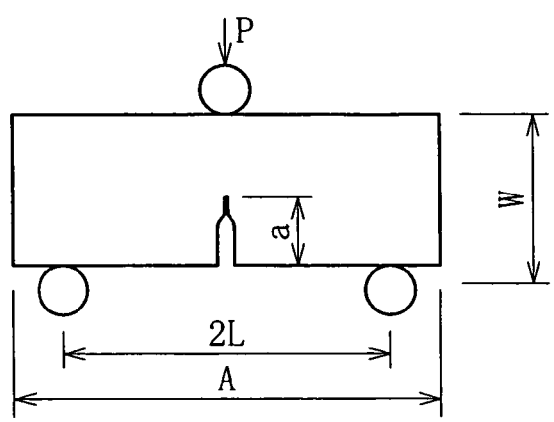
FIG. 16 is a view showing a test piece for static breaking toughness test.

FIG. 16 shows a test piece for static breaking toughness test. An about 1 mm pre-crack fissure was made in the notched portion of this test piece, and a static load by 3-point bending was applied thereto to find the breaking load P. Formula (I) shown below was used to calculate the breaking toughness value ($K_{1C}$). Further, the results are shown in Table 5.

$$KI_C = (PL\sqrt{a}/BW^2) \qquad (I)$$
$$\{5.8 - 9.2(a/W) + 43.6(a/W)^2 - 75.3(a/W)^3 + 77.5(a/W)^4\}$$

TABLE 5

| Material | The number of tests | $K_1C$ (MPa√m) | $K_1C$ ratio |
|---|---|---|---|
| X-material | 3 | 16.3 | 1.0 |
| Y-material | 3 | 16.1 | 1.0 |
| Z-material | 3 | 18.9 | 1.2 |

Because the pre-crack fissure depth has become greater than the carbonitrided layer depth, there is no difference between the X-material and Y-material of the comparative examples. However, The Z-material of the inventive example has obtained about 1.2 times the value of the comparative example.

(4) Static Crush Strength Test

The static crush test piece used was one shown in FIG. 16. In the figure, a load was applied in the P-direction to conduct static crush strength tests. The results of the tests are shown in Table 6.

TABLE 6

| Material | The number of tests | Static crush strength (kgf) | Static crush strength ratio |
|---|---|---|---|
| X-material | 3 | 4200 | 1.00 |
| Y-material | 3 | 3500 | 0.84 |
| Z-material | 3 | 4300 | 1.03 |

The Y-material subjected to carbonitriding shows a value somewhat lower than that of the X-material subjected to ordinary hardening. However, the Z-material of the inventive example has improved in static crush strength over the Y-material and a level which compares favorably with that of X-material has been obtained.

(5) Time-Dependent Dimensional Change Rate

The results of measurements of time-dependent dimensional change rate at a holding temperature of 130° C. with a holding time of 500 hours are shown in Table 7 together with surface hardness, and retained austenite quantity (50 μm deep).

TABLE 7

| Material | The number of tests | Surface hardness (HRC) | Retained γ quantity (%) | Dimensional change rate (×10⁻⁵) | Dimensional change rate ratio |
|---|---|---|---|---|---|
| X-material | 3 | 62.5 | 8.8 | 18 | 1.0 |
| Y-material | 3 | 63.6 | 30.5 | 35 | 1.9 |
| Z-material | 3 | 60.0 | 11.8 | 22 | 1.2 |

It is seen that as compared with the dimensional change rate of the Y-material having much retained austenite quantity, that of the Z-material of the invention is suppressed to be not more than half.

(6) Rolling Life Test under Inclusion of Foreign Matter

A ball bearing 6206 was used and an evaluation was made of the rolling fatigue life under inclusion of foreign matter or a predetermined amount of standard foreign matter. The test results are shown in Table 9.

TABLE 8

| Load | Fr = 6.86 kN |
|---|---|
| Contact surface pressure | Pmax = 3.2 GPa |
| Rotative speed | 2000 rpm |
| Lubrication | Turbine 56 bath lubrication |
| Foreign matter quantity | 0.4 g/1000 cc |
| Foreign matter | Grain size 100–180 μm, hardness Hv 800 |

TABLE 9

| Material | $L_{10}$ life (h) | $L_{10}$ ratio |
|---|---|---|
| X-material | 20.0 | 1.0 |
| Y-material | 50.2 | 2.5 |
| Z-material | 45.8 | 2.2 |

As compared with the X-material, the rolling life of the Y-material subjected to conventional carbonitriding was about 2.5 times, and the Z-material of the inventive example obtained as long a life as about 2.3 times. The Z-material of the inventive example, though containing less retained austenite than the Y-material of comparative example, has obtained a substantially equal long life due to entry of nitrogen and the effect of microstructure being finer.

It is seen from the above results that the Z-material, that is, the inventive example, can simultaneously satisfies the three items, prolongation of rolling fatigue life, improvement in crack strength, and reduction of time-dependent dimensional change rate, which have been difficult to attain by conventional carbonitriding.

Embodiment III

Table 10 shows the results of tests about the relation between nitrogen content and rolling life under inclusion of foreign matter. In addition, a comparative example 1 is an article subjected to standard hardening, and a comparative example 2 is a standard carbonitrided article. A comparative example 3 is a case where excessive nitrogen is contained although a treatment similar to that for the inventive example is performed. The testing conditions are as follows:

Sample bearing: tapered roller bearing 30206 (inner and outer rings and rollers are made of High Carbon Chromium Bearing Steel Class 2 (SUJ2) in JIS)
Radial load: 17.64 kN
Axial load: 1.47 kN
Rotative speed: 2000 rpm
Hard foreign matter inclusion 1 g/L

TABLE 10

| No. | Nitrogen content (%) | Retained austenite (%) | Hardness (Hv) | Rolling life under inclusion of foreign matter | Austenite crystal grain size | Remarks |
|---|---|---|---|---|---|---|
| 1 | 0.11 | 14 | 725 | 321 | 11.8 | Example 1 |
| 2 | 0.16 | 18 | 735 | 378 | 12.0 | Example 2 |
| 3 | 0.18 | 20 | 730 | 362 | 11.9 | Example 3 |
| 4 | 0.32 | 22 | 730 | 396 | 12.1 | Example 4 |
| 5 | 0.61 | 24 | 715 | 434 | 12.2 | Example 5 |
| 6 | 0 | 8 | 770 | 72 | 9.8 | Comparative example 1 |
| 7 | 0.32 | 32 | 710 | 155 | 10.0 | Comparative example 2 |
| 8 | 0.72 | 31 | 700 | 123 | 12.0 | Comparative example 3 |

It is seen from Table 10 that in the examples 1-5, nitrogen content and foreign matter life are substantially in proportional relation to each other. In the light of a sharp decrease in rolling life under inclusion of foreign matter which occurs in the comparative example 3 whose nitrogen content is 0.72, however, it is recommendable that the upper limit of nitrogen content be 0.7.

The tapered roller bearing of the invention can be incorporated into the transmission of an automobile, and besides this, it can be used in applications other than differential gears for automobiles and automobile gear devices.

It is to be understood that the examples disclosed herein are all for illustrative purposes only and should not be taken to be restrictive. The scope of the invention is shown, not by the description given above, but by claims. All changes and modifications equivalent to those included in the scope of the invention are to be included in the claims.

What is claimed is:

1. A tapered roller bearing comprising an inner ring, an outer ring, a plurality of taper rollers rollably disposed between said inner and outer rings, and a cage for holding said tapered rollers at predetermined circumferential intervals, said tapered roller bearing being characterized in that the roller coefficient exceeds 0.94, in that at least one of said outer ring, said inner ring, and said rolling elements, has a nitrogen layer, and in that the grain size number of austenite crystal grains in said nitrogen layer exceeds number 10.

2. A tapered roller bearing as set forth in claim 1, wherein a nitrogen content in the nitrogen layer is in the range of 0.1%-0.7%.

3. A tapered roller bearing as set forth in claim 1, wherein a window angle of pockets is 55°-80°.

4. A tapered roller bearing as set forth in claim 3, wherein said cage is made of an engineering plastic.

5. A tapered roller bearing as set forth in claim 4, wherein a nitrogen content in the nitrogen layer is in the range of 0.1%-0.7%.

6. A tapered roller bearing as set forth in claim 3, wherein a nitrogen content in the nitrogen layer is in the range of 0.1%-0.7%.

7. A tapered roller bearing as set forth in claim 1, wherein said cage is made of an engineering plastic.

8. A tapered roller bearing as set forth in claim 7, wherein a nitrogen content in the nitrogen layer is in the range of 0.1%-0.7%.

* * * * *